United States Patent
Zhang et al.

(10) Patent No.: US 10,335,888 B2
(45) Date of Patent: Jul. 2, 2019

(54) SWIRL RING AND CONTACT ELEMENT FOR A PLASMA ARC TORCH CARTRIDGE

(71) Applicant: Hypertherm, Inc., Hanover, NH (US)

(72) Inventors: Yu Zhang, Hanover, NH (US); Jesse A. Roberts, Cornish, NH (US); Zheng Duan, Hanover, NH (US); Michael Scheller, Grantham, NH (US); David Agan, Enfield, NH (US); Steven Moody, Charlestown, NH (US); Stephen T. Eickhoff, Hanover, NH (US); Garrett K. Quillia, Enfield, NH (US)

(73) Assignee: Hypertherm, Inc., Hanover, NH (US)

(*) Notice: Subject to any disclaimer, the term of this patent is extended or adjusted under 35 U.S.C. 154(b) by 0 days.

(21) Appl. No.: 15/892,678

(22) Filed: Feb. 9, 2018

(65) Prior Publication Data

US 2018/0257164 A1    Sep. 13, 2018

Related U.S. Application Data

(63) Continuation-in-part of application No. 15/043,044, filed on Feb. 12, 2016.

(60) Provisional application No. 62/456,813, filed on Feb. 9, 2017.

(51) Int. Cl.
*B23K 10/00* (2006.01)
*H05H 1/38* (2006.01)
*H05H 1/34* (2006.01)

(52) U.S. Cl.
CPC ............ *B23K 10/00* (2013.01); *B23K 10/003* (2013.01); *H05H 1/34* (2013.01); *H05H 1/38* (2013.01); *H05H 2001/3426* (2013.01); *H05H 2001/3468* (2013.01); *H05H 2001/3473* (2013.01); *H05H 2001/3489* (2013.01)

(58) Field of Classification Search
CPC . B23K 10/00; H05H 1/38; H05H 1/26; H05H 1/34; H05H 2001/3426; H05H 2001/3473
USPC .............. 219/121.44, 121.39, 121.48, 121.5, 219/121.51, 121.52, 75
See application file for complete search history.

(56) References Cited

U.S. PATENT DOCUMENTS

| | | | |
|---|---|---|---|
| 2007/0210034 A1 | 9/2007 | Mather et al. | |
| 2007/0210035 A1 | 9/2007 | Twarog et al. | |
| 2008/0083711 A1 | 4/2008 | Twarog et al. | |
| 2012/0152913 A1 | 6/2012 | Mather et al. | |
| 2012/0181257 A1 | 7/2012 | Mather et al. | |
| 2013/0126487 A1* | 5/2013 | Crowe | B23K 10/00 219/121.48 |

(Continued)

FOREIGN PATENT DOCUMENTS

| | | |
|---|---|---|
| EP | 0591018 A1 | 4/1994 |
| WO | 2008101226 A1 | 8/2008 |

*Primary Examiner* — Mark H Paschall
(74) *Attorney, Agent, or Firm* — Proskauer Rose LLP

(57) ABSTRACT

A swirl ring for a plasma arc torch includes a body configured to at least partially surround and slidingly engage an electrode of the plasma arc torch. The body includes a first end and a second end opposite the first end, the first and second ends defining a longitudinal axis, and at least one protuberance extending from the second end in a direction of the longitudinal axis. The at least one protuberance is configured to engage a switch of the plasma arc torch for sensing a presence of a swirl ring in the plasma arc torch.

23 Claims, 8 Drawing Sheets

(56) References Cited

U.S. PATENT DOCUMENTS

| | | |
|---|---|---|
| 2014/0069895 A1 | 3/2014 | Brine et al. |
| 2014/0113527 A1 | 4/2014 | Lindsay et al. |
| 2015/0319836 A1 | 11/2015 | Sanders |
| 2015/0351213 A1 | 12/2015 | Crowe et al. |
| 2016/0050740 A1 | 2/2016 | Zhang et al. |
| 2016/0165711 A1 | 6/2016 | Zhang et al. |
| 2016/0165712 A1 | 6/2016 | Zhang et al. |
| 2016/0221108 A1* | 8/2016 | Hoffa .................. B23K 10/006 |
| 2016/0375519 A1 | 12/2016 | Crowe |
| 2018/0007774 A1 | 1/2018 | Crowe |

* cited by examiner

SWIRL RING AND CONTACT ELEMENT FOR A PLASMA ARC TORCH CARTRIDGE

RELATED APPLICATION

This application is a continuation-in-part U.S. application Ser. No. 15/043,044, filed Feb. 12, 2016 and entitled "Cost Effective Cartridge for a Plasma Arc Torch." This application also claims the benefit of U.S. Provisional Patent Application No. 62/456,813, which was filed on Feb. 9, 2017 and entitled "Moving Crown for Cartridge." The entire contents of all these applications are incorporated herein by reference in their entirety.

FIELD OF THE INVENTION

The invention relates generally to the field of plasma arc cutting systems and processes. More specifically, the invention relates to improved consumable components (e.g., swirl rings including contact elements) for operating a plasma arc torch.

BACKGROUND

Plasma arc torches are widely used in the cutting and marking of materials. A plasma arc torch generally includes an electrode and a nozzle having a central exit orifice mounted within a torch body, electrical connections, passages for cooling, and passages for arc control fluids (e.g., plasma gas). The torch produces a plasma arc, i.e., a constricted ionized jet of a gas with high temperature and high momentum. Gases used in the torch can be non-reactive (e.g., argon or nitrogen) or reactive (e.g., oxygen or air). During operation, a pilot arc is first generated between the electrode (part of the cathode) and the nozzle (part of the anode). Generation of the pilot arc can be by means of a high frequency, high voltage signal coupled to a DC power supply and the torch or by means of any of a variety of starting methods. Plasma arc torches can utilize cartridges including one or more consumable components (e.g., a nozzle, electrode, and/or a swirl ring) for ease of installation and operation.

FIGS. 1 and 2 show a cartridge for a plasma arc torch 100 having a nozzle 104, a shield 108, an electrode 112, a retaining cap 116, a swirl ring 120, and a fixed "crown" or contact element 124 disposed about the swirl ring 120. This contact element 124 does not move relative to the swirl ring 120, e.g., is fixed in an axial direction relative to the swirl ring 120. The contact element 124 passes a cutting current from a plunger 132 of the plasma arc torch 100 to the electrode 112. Because plasma cutting requires a high cutting current, a solid electrical connection must be maintained between the plasma arc torch 100 and the electrode 112 to ensure proper operation and to limit or eliminate arcing, which can damage equipment and shorten component life.

This "fixed crown" design has a failure mode when the contact element 124 is not in full contact with the plunger 132 (e.g., because the cartridge is not fully tightened within the plasma arc torch 100). In this failure mode, a gap 228 can be created between the contact element 124 and the plunger 132, as shown in FIG. 2. This gap 228 results in a poor electrical connection, and can cause poor performance and component failure. In addition, the poor connection can lead to arcing between the cathode (e.g., the plunger 132) and the contact element 124, which can destroy the entire torch instead of just one or more consumable components. What is needed is a consumable cartridge that avoids this failure mode and ensures proper and complete contact between the plunger 132 and the contact element 124, even if the cartridge is not fully screwed on or is otherwise loose.

SUMMARY OF THE INVENTION

The present invention relates to improved consumables (e.g., plasma arc torch cartridges and swirl rings including contact elements) for plasma arc torches and associated methods of operation. Specifically, the design shown and described above in FIGS. 1-2 is modified such that the "fixed crown" above is replaced by a "floating" contact element, which is a separate piece within the cartridge that is allowed to translate a predetermined distance (e.g., an axial length) within the torch during installation and/or operation in the torch. The contact element can be snap fitted or dropped within a swirl ring or cartridge and confined to a certain region within which there is enough space (or "play") for the contact element to slide freely. In such a configuration, proper and complete contact with the torch cathode can be maintained even if the cartridge is not fully screwed onto the torch (with the torch cathode biasing the contact element axially forward). This configuration protects the torch and ensures that proper electrical contact is maintained within the torch.

For example, one embodiment includes a "snap fit" design that allows the contact element to travel in an axial direction at the fault region during installation in the torch. Thus, instead of being rigidly fixed to the swirl ring, the contact element is located within a track or set of tracks within the swirl ring and is biased by a spring that pushes the contact element toward the torch if there is a gap (e.g., because of an untightened thread). During proper assembly the cathode will push the contact element forward slightly toward the electrode but still maintain a gap for piloting. The gap and the spring being compressed during cutting and arc ignition are a result of gas force in the swirl ring and plenum. This freedom of movement of the contact element ensures proper mating with the cathode through several stages of cartridge turning and installation.

In one aspect, the invention features a consumable cartridge for a plasma arc torch. The consumable cartridge includes a cartridge frame having a first end and a second end opposite the first end. The first and second ends defines a longitudinal axis. The second end includes a plurality of discrete retaining features. The consumable cartridge also includes an electrically conductive contact element secured to the cartridge frame by the plurality of discrete retaining features and is translatable up to a predetermined distance within the cartridge frame along the longitudinal axis at the second end. The contact element has a core, a proximal surface, and a distal surface. The proximal surface is shaped to contact a torch plunger of the plasma arc torch upon installation into the plasma arc torch. The distal surface is shaped to contact an electrode of the plasma arc torch during an operation of the plasma arc torch.

In some embodiments, at least one discrete retaining feature in the plurality of discrete retaining features is configured to engage a switch for sensing a presence of a cartridge frame, cartridge or retaining cap secured to a torch body of the plasma arc torch. In some embodiments, at least one discrete retaining feature in the plurality of discrete retaining features includes a guide track for interfacing with the contact element. In some embodiments, the contact element includes at least one guide channel for interfacing with the at least one discrete retaining feature in the plurality of discrete retaining features. In some embodiments, the plurality of discrete retaining features includes one or more axial stops. In some embodiments, the cartridge frame forms a swirl ring or swirl feature of the plasma arc torch, the first end of the cartridge frame including a set of passages fluidly connecting an internal surface of the cartridge frame and an external surface of the cartridge frame.

In some embodiments, the contact element includes a snap fit feature for coupling to the cartridge frame. In some embodiments, an electrode is disposed within the cartridge frame, the electrode interacting with (e.g., including) a spring configured to bias the contact element toward a cathode of the plasma arc torch. In some embodiments, the contact element is configured to slide along the longitudinal axis during installation in the plasma arc torch upon contact with the torch plunger. In some embodiments, the plurality of discrete retaining features is shaped to matingly engage the contact element and to define a translation path of the contact element within the cartridge frame. In some embodiments, the plurality of discrete retaining features and the contact element define a set of vent passages. In some embodiments, the translation path has two or more radial interface surfaces between the contact element and the cartridge frame.

In some embodiments, the contact element includes scalloped edges. In some embodiments, the contact element includes a cap feature integrally formed with the core. In some embodiments, the cartridge frame is formed of a thermoplastic. In some embodiments, the cartridge frame is molded. In some embodiments, the contact element is physically separate from an electrode within the consumable cartridge. In some embodiments, the contact element is removed from direct physical contact with the electrode when the plasma arc torch is not in operation. In some embodiments, a thickness between the proximal surface and the distal surface is at least double a thickness at a perimeter of the core.

In another aspect, the invention features a swirl ring for a plasma arc torch. The swirl ring includes a body shaped to matingly engage an electrode of the plasma arc torch. The body includes a first end and a second end. The first and second ends define a longitudinal axis. The body also includes a set of protuberances extending from the second end in a direction of the longitudinal axis. At least one protuberance includes an interior guide track. The swirl ring also includes an electrically conductive contact element confined by the set of protuberances. The contact element includes at least one guide channel complementary to the at least one guide track. An alignment of the contact element with the swirl ring is facilitated by an interaction of the at least one guide channel with the at least one guide track.

In some embodiments, the at least one protuberance defines a region that the contact element can occupy during a normal operation of the plasma arc torch. In some embodiments, the first end includes a set of passages fluildly connecting an internal surface of the swirl ring and an external surface of the swirl ring. In some embodiments, the contact element includes a snap fit feature for coupling to the body of the swirl ring. In some embodiments, the electrode interacts with or includes a spring configured to bias the contact element toward a cathode of the plasma arc torch. In some embodiments, the contact element is configured to slide along the longitudinal axis during installation in the plasma arc torch upon contact with a plunger of the plasma arc torch. In some embodiments, one or more protuberances has a linear height of between approximately 5 and 7 millimeters. In some embodiments, one or more protuberances has a linear width of between approximately 1 and 3 millimeters. In some embodiments, one or more protuberances has a linear length of between approximately 6 and 8 millimeters.

In some embodiments, the set of protuberances defines a translation path for the contact element. In some embodiments, the swirl ring and the contact element define a set of vent passages. In some embodiments, the translation path has two or more radial interface surfaces between the contact element and the swirl ring. In some embodiments, the contact element includes scalloped edges. In some embodiments, the contact element has a substantially uniform cross-sectional thickness. In some embodiments, the swirl ring is formed of a thermoplastic. In some embodiments, the swirl ring is molded. In some embodiments, the contact element is removed from direct physical contact with the electrode when the plasma arc torch is not in operation.

In another aspect, the invention features a swirl ring for a plasma arc torch. The swirl ring includes a body configured to at least partially surround and slidingly engage an electrode of the plasma arc torch. The body includes a first end and a second end opposite the first end. The first and second ends define a longitudinal axis. The body also includes a set of protuberances extending from the second end in a direction of the longitudinal axis. At least one of protuberances is configured to engage a switch for sensing a presence of a swirl ring or a retaining cap of the plasma arc torch. In some embodiments, a set of molded swirl holes is integrally formed within the body of the swirl ring. In some embodiments, the swirl ring includes a crimped on, unitary nozzle. In some embodiments, the swirl ring includes an electrically conductive contact element confined within the set of protuberances, wherein the set of protuberances includes a set of guide tracks and the contact element includes a set of guide channels complementary to the set of guide tracks. In some embodiments, the set of protuberances includes a retaining feature to confine the contact element.

In another aspect, the invention features a consumable cartridge for a plasma arc torch. The consumable cartridge includes a cartridge frame and an electrically conductive contact element confined by the cartridge frame. The consumable cartridge further includes means for locking the contact element into the plasma arc torch during an operation of the plasma arc torch. In another aspect, the invention features a consumable cartridge for a plasma arc torch. The consumable cartridge includes a cartridge frame. The consumable cartridge (e.g., the frame) further includes means for engaging a consumable sense feature of the plasma arc torch during the operation of the plasma arc torch.

In another aspect, the invention features a method of operation of a plasma arc torch. The method includes installing a consumable cartridge in the plasma arc torch. The consumable cartridge has a cartridge frame with a first end and a second end that define a longitudinal axis. The consumable cartridge includes an electrically conductive contact element confined by the cartridge frame. The method also includes translating the contact element in a first direction along the longitudinal axis toward the first end once contact is made with a torch plunger of the plasma arc torch. The method also includes translating an electrode of the plasma arc torch in a second direction opposite the first direction along the longitudinal axis. The electrode contacts the contact element during a plasma (e.g., cutting or gouging) operation of the plasma arc torch. The contact element is separated from the electrode when the plasma arc torch is not performing the plasma operation.

In another aspect, the invention features a method of assembling a plasma arc torch cartridge. The method includes providing a swirl ring having body shaped to matingly engage an electrode of a plasma arc torch. The body includes a first end and a second end that define a longitudinal axis. The body also includes a set of protuberances extending from the second end along a direction of the longitudinal axis. The set of protuberances includes a set of guide tracks. The method also includes providing an electrically conductive contact element having a set of guide channels complementary to the set of guide tracks of the swirl ring. The method also includes installing the contact element in the swirl ring, the guide channels of the contact element matingly engaging the set of guide tracks of the swirl ring. During installation of the contact element into the swirl ring, the contact element translates a fixed distance along the longitudinal axis within the swirl ring until the nozzle is attached to the first end of the swirl ring. After installation, the contact element is held securely within the plasma arc torch cartridge (e.g., confined within a region, but free to move in an axial direction within the region). In some embodiments, after installation the contact element is able to translate a fixed distance within the plasma arc torch cartridge along the longitudinal axis. In some embodiments, the translation of the contact element in a direction of the second end is limited by at least one retaining feature disposed on an interior surface of at least one of the protuberances.

In another aspect, the invention features a consumable cartridge for a plasma arc torch. The consumable cartridge includes a body configured to at least partially surround and slidingly engage an electrode of the plasma arc torch. The body includes a distal first end and a proximal second end opposite the first end. The first and second ends defining a longitudinal axis. The consumable cartridge also includes an intermediate component configured to be positioned between the body and a safety switch of the plasma arc torch, the intermediate component including at least one discrete protuberance affixed to a proximal end of the intermediate component, the discrete protuberance extending from the proximal end of the intermediate component in a direction of the longitudinal axis. The at least one discrete protuberance is configured to enable an operation of the plasma arc torch by sensing a presence of a consumable (e.g., swirl ring or retaining cap) of the plasma arc torch by the safety switch. In another aspect, the invention features a method of enabling an operation of a plasma arc cutting torch. The method includes providing a protuberance on a body of a torch cartridge. The method also includes installing the torch cartridge in a plasma arc torch, the protuberance activating a safety switch for sensing a presence of a consumable (e.g., swirl ring or retaining cap) of the plasma arc torch.

In some embodiments, the cartridge includes a spring electrode having a "floating crown" that is located dynamically within the swirl ring of the cartridge. In some embodiments, when not in operation, the floating crown is not in direct physical contact with the electrode (e.g., is contacting only the spring connecting the two). In some embodiments, the swirl ring and the floating crown include complementary tracks or guides. In some embodiments, the floating crown has a non-circular shape with a number of tabs and/or slots that would be expensive and/or difficult to machine. In some embodiments, an additional set of alignment surfaces influences electrical contacts within the torch (in certain previous embodiments, the electrode, the contact element, and the plunger provided such surfaces, whereas here the swirl ring also provides such surfaces). In some embodiments, as installation occurs, the crown translates axially forward once contact is made with the torch plunger, and then when firing the electrode translates back into the floating crown to fire. In some embodiments, one or more configurations described herein result in improved consumable alignment. In some embodiments, one or more configurations described herein provide more reliable contact or connection between the plunger and the electrode, even during incomplete installation, which enables faster consumable changes and reduction in cost.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 2:
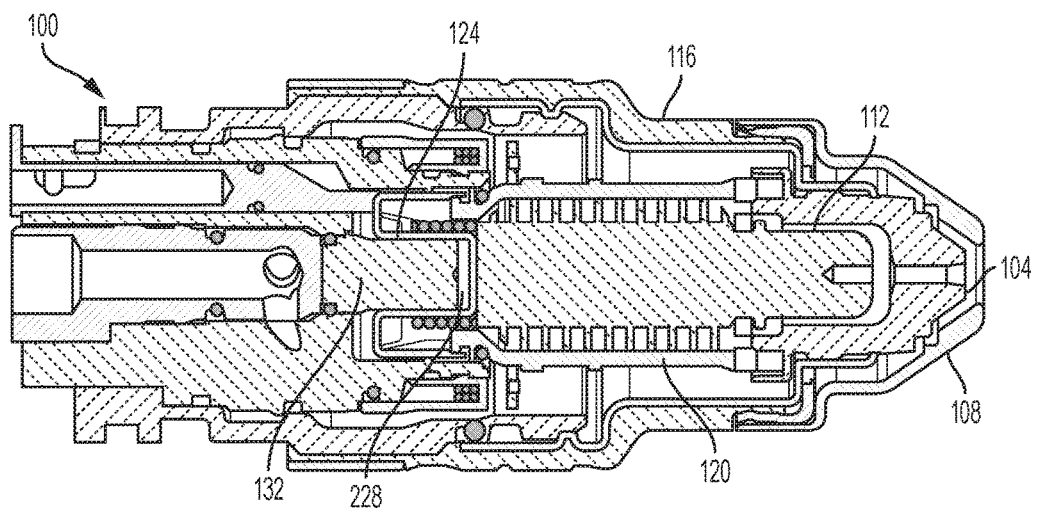
FIG. 2 is a cross-sectional view of a plasma arc torch with an improperly installed "fixed crown" cartridge.
Figure 3:
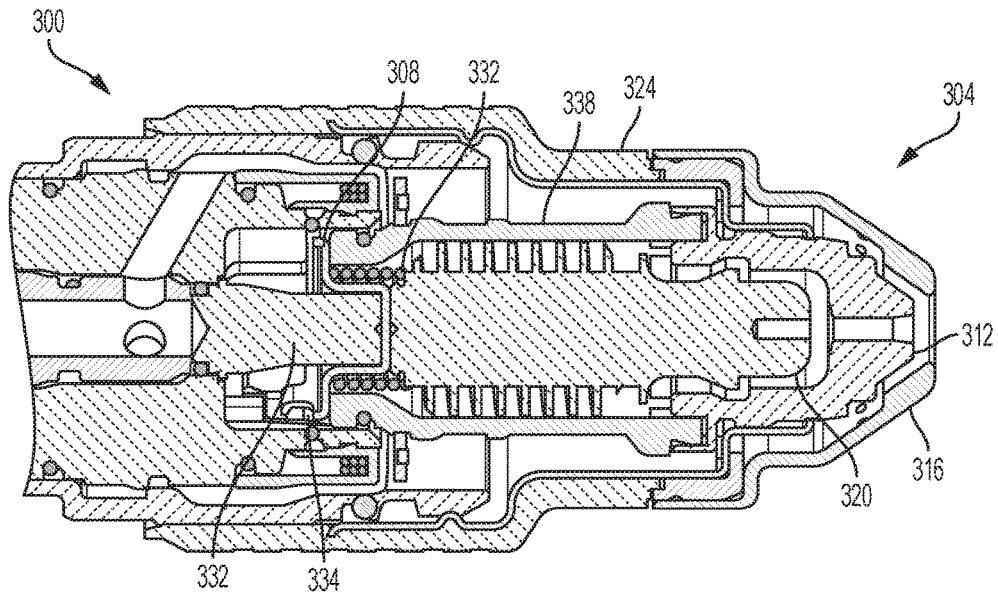
FIG. 3 is a cross-sectional view of a plasma arc torch with a cartridge including a "floating crown" or contact element installed therein, according to an illustrative embodiment of the invention.

FIG. 3 is a cross-sectional view of a plasma arc torch 300 with a cartridge 304 including a "floating crown" or electrically conductive contact element 308 installed therein, according to an illustrative embodiment of the invention. The plasma arc torch 300 has a nozzle 312, a shield 316, an electrode 320, a retaining cap 324, and a swirl ring 328. The contact element 308 installed in the plasma arc torch 300 includes a spring 332 of the electrode 320 configured to bias the contact element 308 axially backward toward the plunger (cathode) 332. During proper assembly, the cathode 332 will push the contact element 308 slightly forward toward the electrode 320 but still maintain a gap between the electrode 320 and the contact element 308 for piloting and arc generation during a beginning of operation. During cutting and/or arc ignition, this gap and the spring will be fully compressed as a result of gas forces within the swirl ring 328 (and/or plenum). In contrast to the embodiment shown in FIGS. 1 and 2, this freedom of movement of the contact element 308 ensures proper mating with the cathode 332 through several stages of cartridge turning and installation.

Figures 4A, 4B:
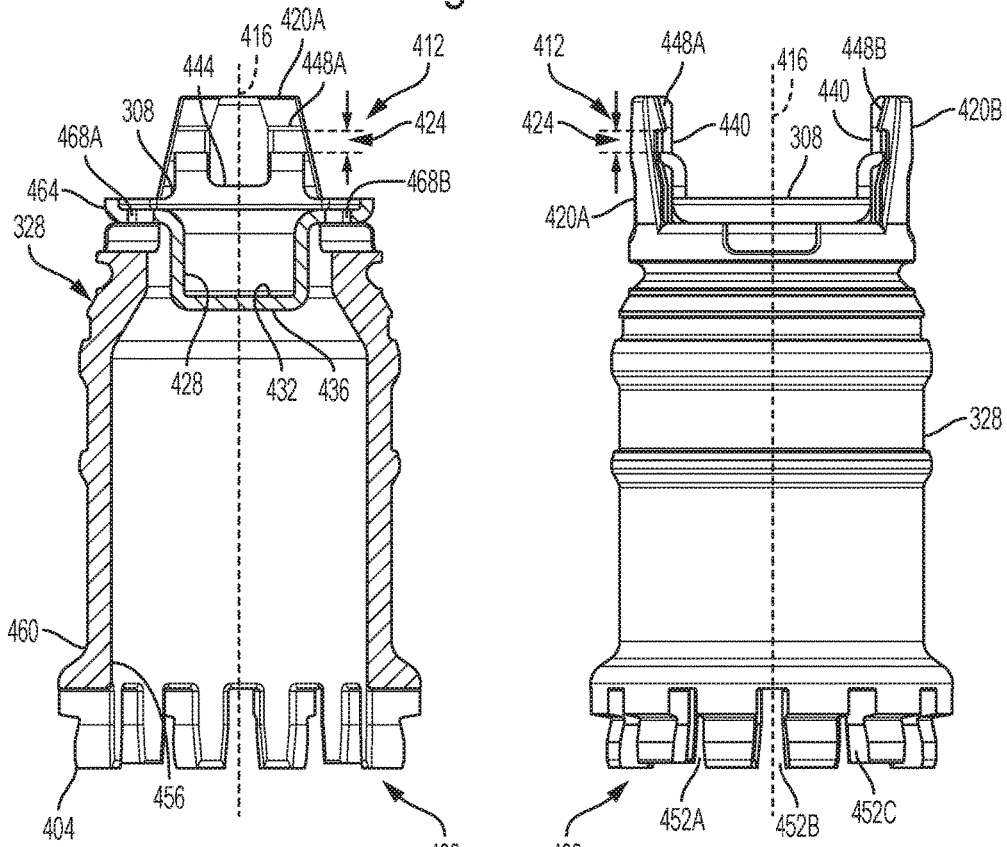
FIG. 4A is a cross-sectional view of a swirl ring having a "floating crown" or contact element installed therein, according to an illustrative embodiment of the invention.
FIG. 4B is a side view of the swirl ring of FIG. 4A rotated 90 degrees about a longitudinal axis of the swirl ring, according to an illustrative embodiment of the invention.

FIG. 4A is a cross-sectional view of the swirl ring 328 (e.g., a consumable cartridge for a plasma arc torch) having a "floating crown" or electrically conductive contact element 308 installed therein, according to an illustrative embodiment of the invention, and FIG. 4B is a side view of the swirl ring of FIG. 4A rotated 90 degrees about a longitudinal axis 404 of the swirl ring 328. The swirl ring 328 has a body 404 (e.g., a cartridge frame) having a first end 408 and a second end 412 opposite the first end 408, the first and second ends defining a longitudinal axis 416. The second end 412 includes a plurality of discrete retaining features 420A, 420B. The discrete retaining features 420A, 420B can be protuberances that take the shape of projections, distensions or longitudinal extensions at the second end 412. In this embodiment, there are two retaining features 420A, 420B that are diametrically opposed, but in other embodiments there are another number of discrete retaining features, including three, four, or a different number.

The contact element 308 is secured to the body 404 by the plurality of discrete retaining features 420A, 420B. The contact element 308 has a core 428, a proximal surface 432, and a distal surface 436. The proximal surface 432 is shaped to contact a torch plunger (e.g., the cathode 332 shown and described in FIG. 3) of the plasma arc torch upon installation into the plasma arc torch. The distal surface 436 is shaped to contact an electrode (e.g., the electrode 320 shown and described in FIG. 3) of the plasma arc torch during an operation of the plasma arc torch. The contact element 308 is physically separate from the electrode 320 and is removed from direct physical contact with the electrode 320 when the plasma arc torch 300 is not in operation. The contact element 308 is translatable up to a predetermined distance 424 within the body 404 along the longitudinal axis 416 at the second end 412. The contact element 308 can be manufactured from brass, copper, and/or another conductive material.

At least one discrete retaining feature (or protuberance) in the plurality of discrete retaining features 420A, 420B can include a means for engaging a consumable sense feature of the plasma arc torch (e.g., a switch 334) during operation of the plasma arc torch. The consumable sense feature can be for sensing a presence of a consumable (e.g., the retaining cap 324) secured to a torch body of the plasma arc torch, as shown in FIG. 3. In addition, at least one discrete retaining feature in the plurality of discrete retaining features 420A, 420B (as shown, each discrete retaining feature) includes a guide track 440 for interfacing with the contact element 308. The contact element 308 includes at least one complementary guide channel 444 for interfacing with the at least one discrete retaining feature in the plurality of discrete retaining features 420A, 420B. In some embodiments, the plurality of discrete retaining features 420A, 420B can include one or more axial stops 448A, 448B (or "lip" features) that serve, e.g., as a means for locking the contact element 308 into the cartridge. The plurality of discrete retaining features 420A, 420B is shaped to matingly engage the contact element 308 and to define a translation path of the contact element 308 within the body (e.g., corresponding to the predetermined distance 424). The translation path has two or more radial interface surfaces between the contact element 308 and the body 404.

The body 404 can form a swirl ring or swirl feature of the plasma arc torch. The first end of the body 404 includes a set of passages (e.g., passages 452A, 452B, 452C, etc.) fluidly connecting an internal surface 456 of the body 404 and an external surface 460 of the body 404. The contact element 308 can include a snap fit feature 464 for coupling to the body 404. The contact element 308 can be configured to slide along the longitudinal axis 416 during installation in the plasma arc torch upon contact with the torch plunger 332. The plurality of discrete retaining features 420A, 420B and the contact element 308 define a set of vent passages 468A, 468B. In some embodiments, the contact element includes a "cap" feature integrally formed with the core (e.g., as shown below in FIG. 6A). In some embodiments, the contact element 308 includes scalloped edges (e.g., as shown below in FIG. 6B). In some embodiments, the body 404 is formed of a thermoplastic and/or is molded.

Figure 1:
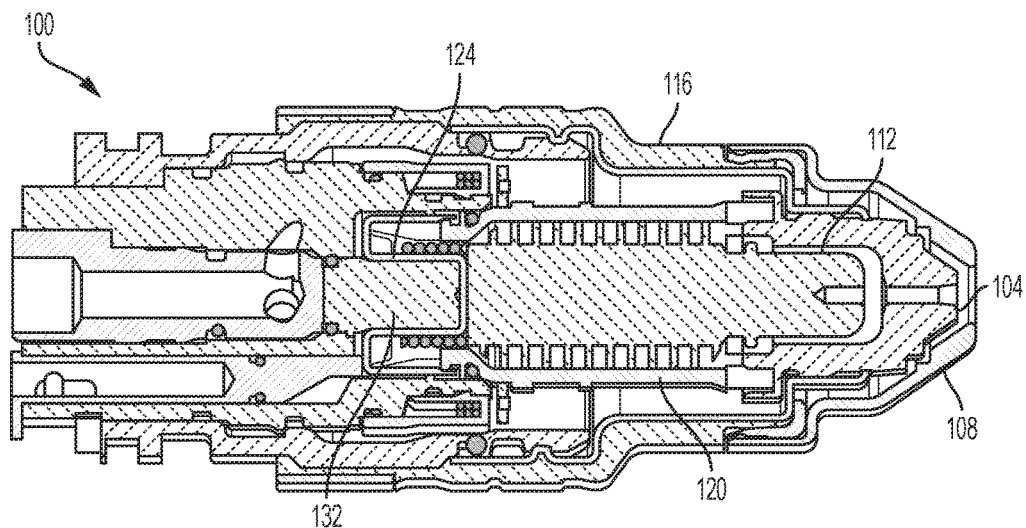
FIG. 1 is a cross-sectional view of a plasma arc torch with a properly installed "fixed crown" cartridge.

The embodiment of the invention shown in FIGS. 3 and 4A-4B has been tested in comparison to the "fixed crown" cartridge design of FIGS. 1 and 2. During testing, the cartridge thread for each setup was left slightly untightened to generate a gap of roughly 0.040 inches. Each system was run in gouging mode, which provides a lower gas pressure and a higher risk of arcing. For the "fixed crown" cartridge design of FIGS. 1 and 2, two test cases out of twelve failed, and in one of those two test cases, the torch was completely burned or destroyed. By comparison, when the same tests were run with the "floating crown" embodiment shown in FIGS. 3 and 4A-4B, the torch passed the test every time without any damage, showing that the embodiment of FIGS. 3 and 4A-4B provides a more robust torch and consumable design.

Figure 5A:
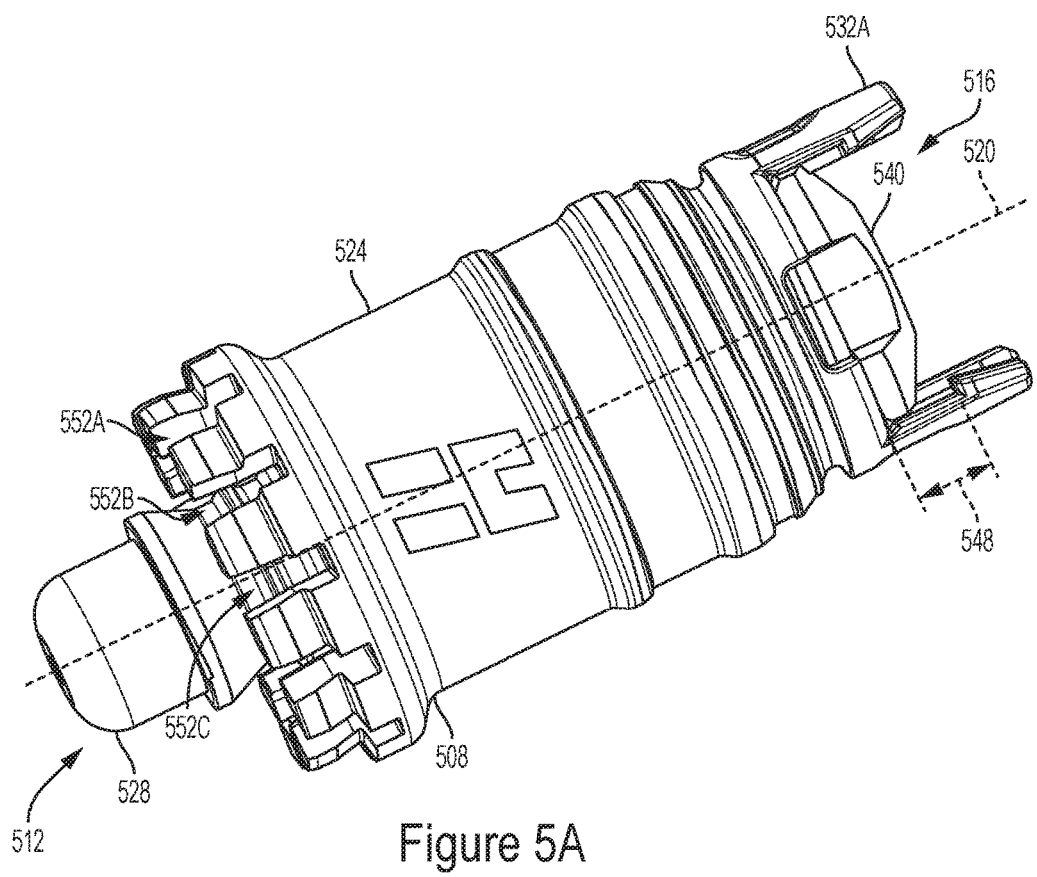
FIG. 5A is a side view of a plasma arc torch cartridge having an electrode and a contact element installed therein, according to an illustrative embodiment of the invention.
Figure 5B:
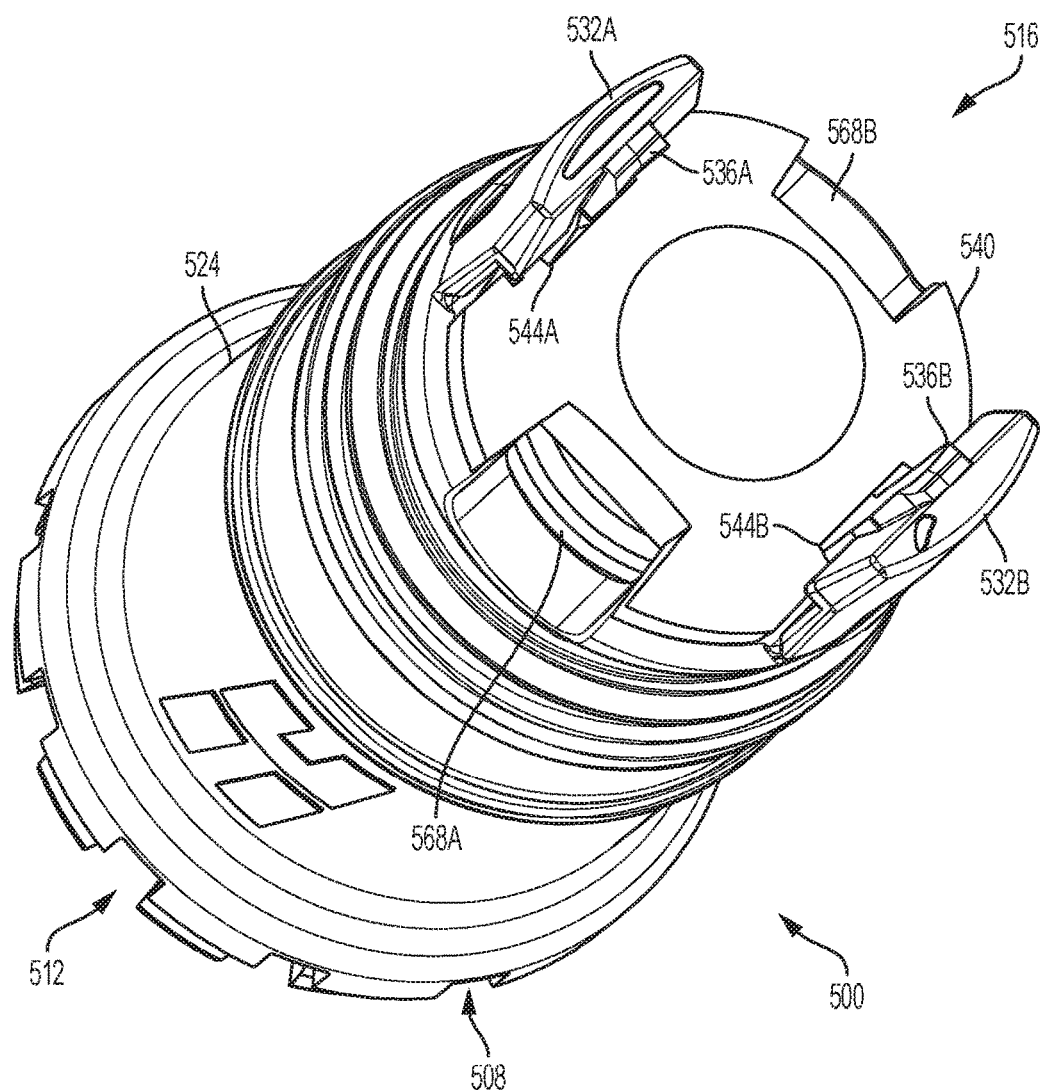
FIG. 5B is a top view of the plasma arc torch cartridge of FIG. 5A, according to an illustrative embodiment of the invention.
Figure 5C:
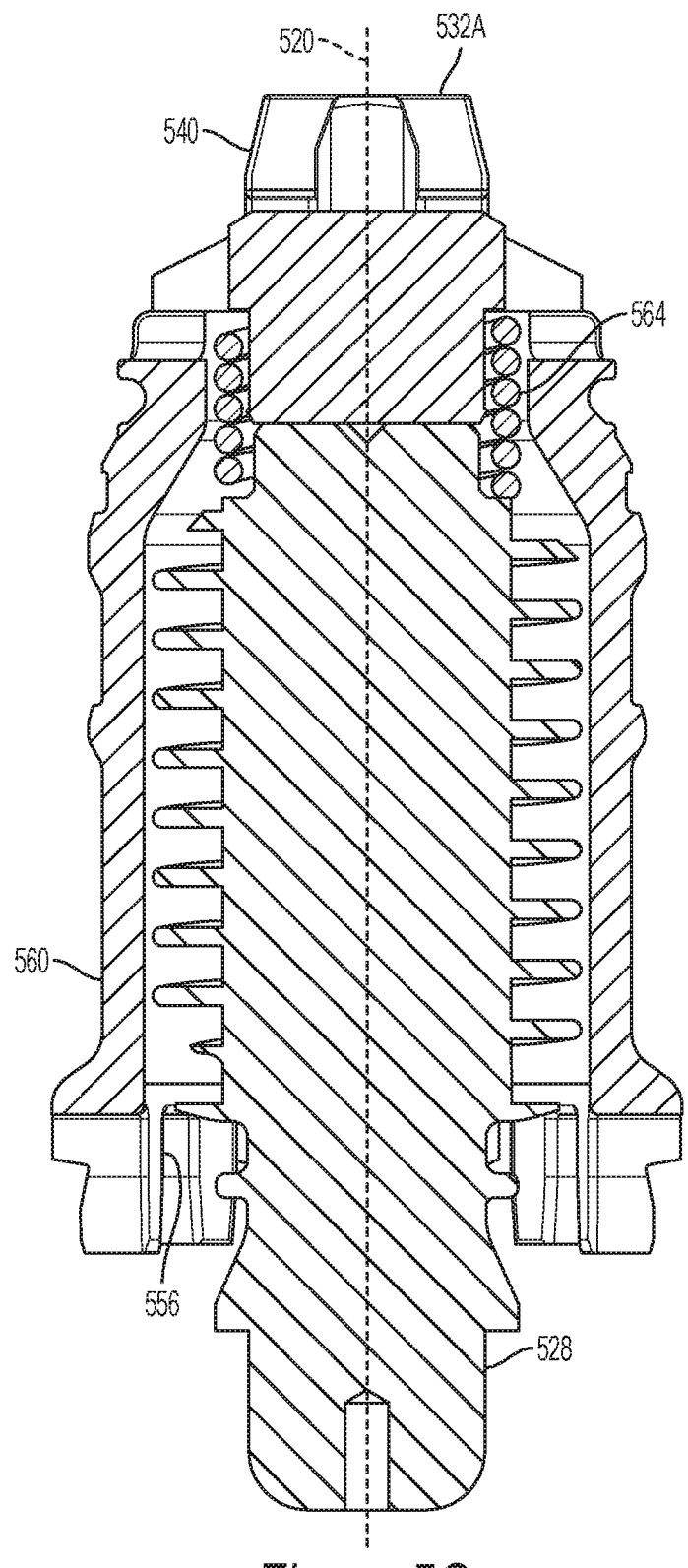
FIG. 5C is a sectional view of the plasma arc torch cartridge of FIG. 5A, according to an illustrative embodiment of the invention.
Figure 5D:
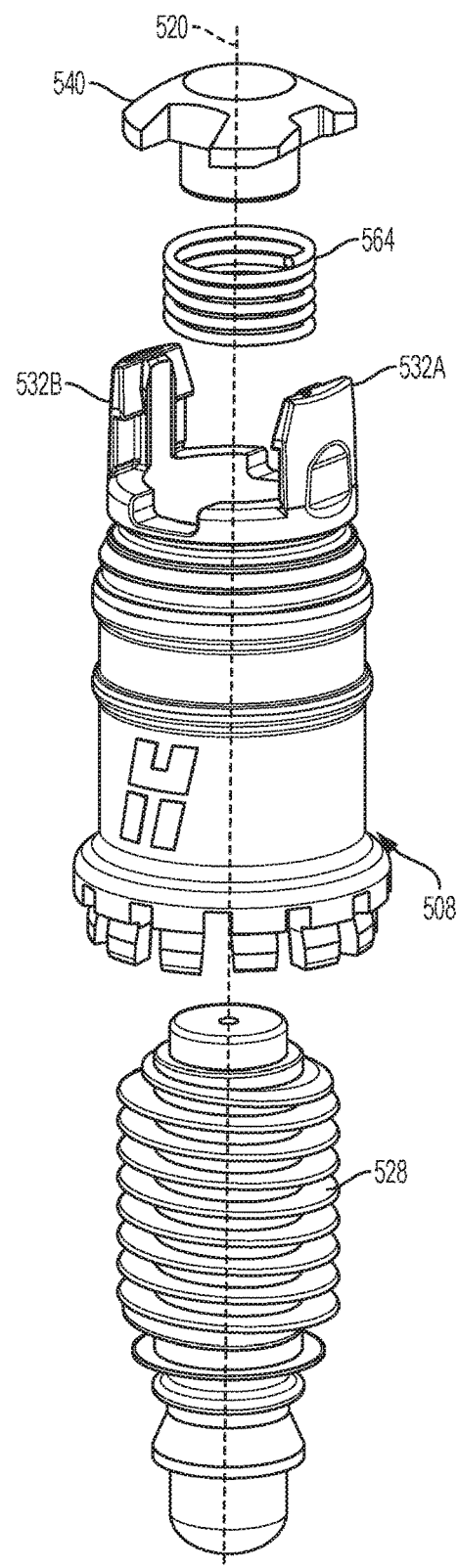
FIG. 5D is an exploded view of the plasma arc torch cartridge of FIG. 5A, according to an illustrative embodiment of the invention.

FIGS. 5A-5D show various views of another consumable cartridge 500 for a plasma arc torch having a contact element 540 installed therein, according to another illustrative embodiment of the invention (FIG. 5A shows a side view; FIG. 5B shows a top view; FIG. 5C shows a sectional view; FIG. 5D shows an exploded view). Elements of this consumable cartridge 500 can be substantially similar to those shown and described above in FIGS. 4A-4B. The consumable cartridge 500 includes a swirl ring 508 having a body 524. The body includes a first end 512 and a second end 516 opposite the first end 512, the first and second ends 512, 516 defining a longitudinal axis 520. The body 524 is shaped to matingly engage an electrode 528 of the plasma arc torch. The body 524 includes a set of protuberances 532A, 532B extending from the second end 516 in a direction of the longitudinal axis 520. At least one protuberance 532A, 532B includes an interior guide track 536A, 536B. The swirl ring 508 also includes an electrically conductive contact element 540 confined by the set of protuberances 532A, 532B. The contact element 540 includes at least one guide channel 544A, 544B complementary to the at least one guide track 536A, 536B. Alignment of the contact element 540 with the swirl ring 508 is facilitated by an interaction of the at least one guide channel 544A, 544B with the at least one guide track 536A, 536B.

At least one protuberance 532A, 532B defines a region 548 that the contact element 540 can occupy during normal operation of the plasma arc torch. The first end 512 includes a set of passages (e.g., 552A, 552B, 552C, and similar passages) fluidly connecting an internal surface 556 of the swirl ring 508 and an external surface 560 of the swirl ring 508. The contact element 540 can include a snap fit feature for coupling to the body of the swirl ring 508 (e.g., it can snap within the protuberances and be retained within the consumable cartridge 500 by the same). The electrode 528 includes a spring 564 configured to bias the contact element 540 toward a cathode of the plasma arc torch. The contact element 540 is configured to slide along the longitudinal axis 520 during installation in the plasma arc torch upon contact with a plunger of the plasma arc torch. The set of protuberances 532A, 532B defines a translation path (e.g., within and confined to the region 548) for the contact element 540. The set of protuberances 532A, 532B and the contact element 540 define a set of vent passages 568A, 568B. The translation path has two or more radial interface surfaces 572A, 572B between the contact element 540 and the swirl ring 508. In some embodiments, one or more protuberances in the set of protuberances 532A, 532B can have one or more of the following linear dimensions: a height (e.g., in a direction of the longitudinal axis) of approximately 6.3 millimeters, or optionally between approximately 6.1 and 6.5 millimeters, or optionally between approximately 5 and 7 millimeters; a width (e.g., in a direction of a radius of the consumable cartridge) of approximately 2.0 millimeters, or optionally between approximately 1.8 and 2.2 millimeters, or optionally between approximately 1 and 3 millimeters; and/or a length (e.g., in a direction perpendicular to both the width and the height) of approximately 6.9 millimeters, or optionally between approximately 6.7 and 7.1 millimeters, or optionally between approximately 6 and 8 millimeters.

Figure 6A:
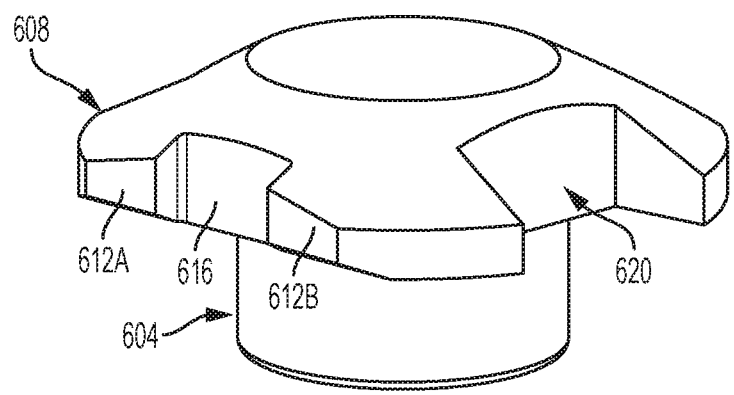
FIG. 6A is a perspective view of the contact element for a plasma arc torch cartridge shown in FIGS. 5A-5D, according to an illustrative embodiment of the invention.
Figure 6B:
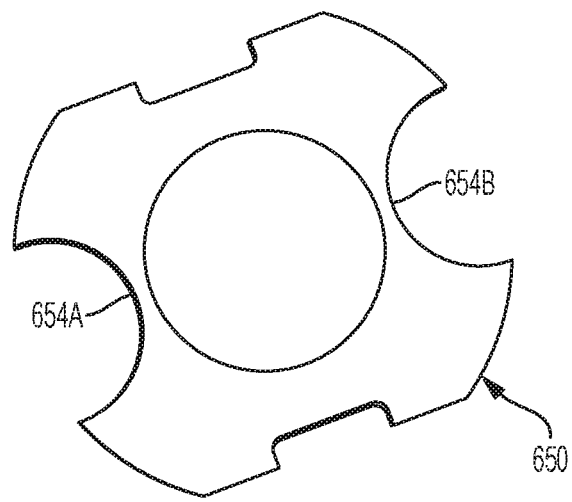
FIG. 6B is a top view of a contact element for a plasma arc torch cartridge having scalloped edges, according to an illustrative embodiment of the invention.

FIG. 6A is a perspective view of the contact element 540 for a plasma arc torch cartridge shown in FIGS. 5A-5D, according to an illustrative embodiment of the invention. This contact element 540 is electrically conductive. The contact element 540 has a core 604 (e.g., a solid core or a hollow core) and a cap 608. The cap 608 includes one or more locating surfaces 612A, 612B for aligning with a swirl ring (e.g., swirl ring 508) of a plasma arc torch cartridge and one or more channels 616 for interlocking with complementary protuberances of a swirl ring. The contact element 540 has one or more further channels 620 for defining a set of vent passages when engaged with one or more protuberances of a swirl ring. The contact element 540 can have a similar set of features on an opposing end (e.g., 180 degrees away from) of the contact element 540 for each of the one or more channels 616 and the further channel 620 (both not shown). FIG. 6B shows a similar contact element 650 with some differences. One notable difference is that the channels 654A, 654B for forming the vent passages have scalloped edges, rather than square or angular edges. One of ordinary skill in the art will readily appreciate that other shapes and configurations are also possible.

Figure 7:
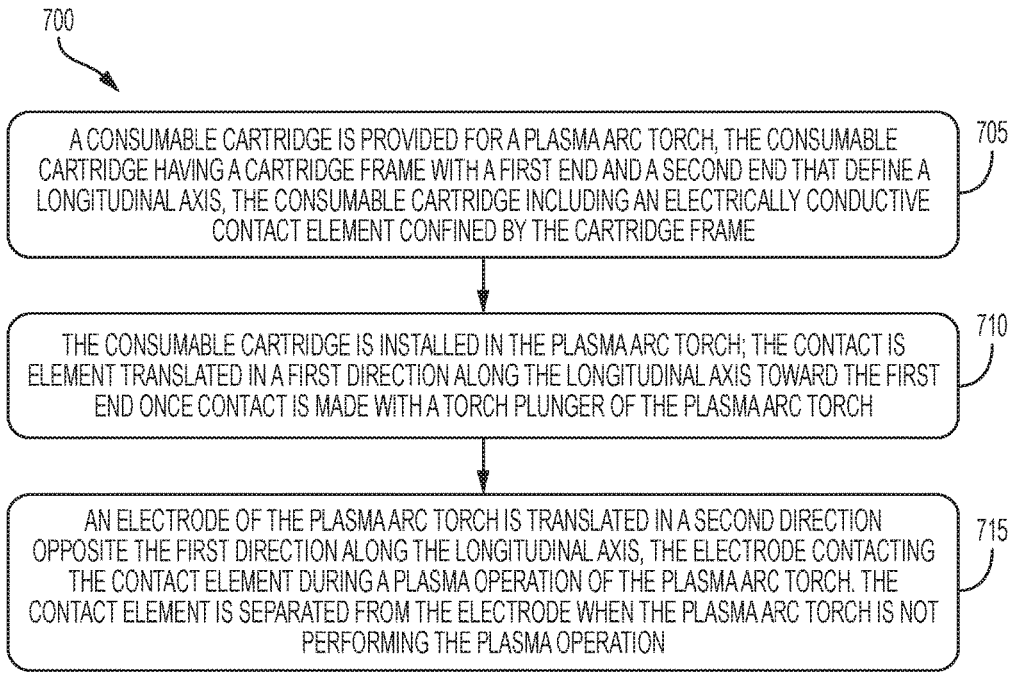
FIG. 7 is a flow diagram illustrating a method of operation of a plasma arc torch, according to an illustrative embodiment of the invention.

FIG. 7 is a flow diagram illustrating a method 700 of operation of a plasma arc torch, according to an illustrative embodiment of the invention. In a first step 705, a consumable cartridge is provided for the plasma arc torch, the consumable cartridge having a cartridge frame with a first end and a second end that define a longitudinal axis, the consumable cartridge including an electrically conductive contact element confined by the cartridge frame. In a second step 710, the consumable cartridge is installed in the plasma arc torch, the contact element translated in a first direction along the longitudinal axis toward the first end once contact is made with a torch plunger of the plasma arc torch. In a third step 715, an electrode of the plasma arc torch is translated in a second direction opposite the first direction along the longitudinal axis, the electrode contacting the contact element during a plasma operation of the plasma arc torch. The contact element is separated from the electrode when the plasma arc torch is not performing the plasma operation.

Figure 8:
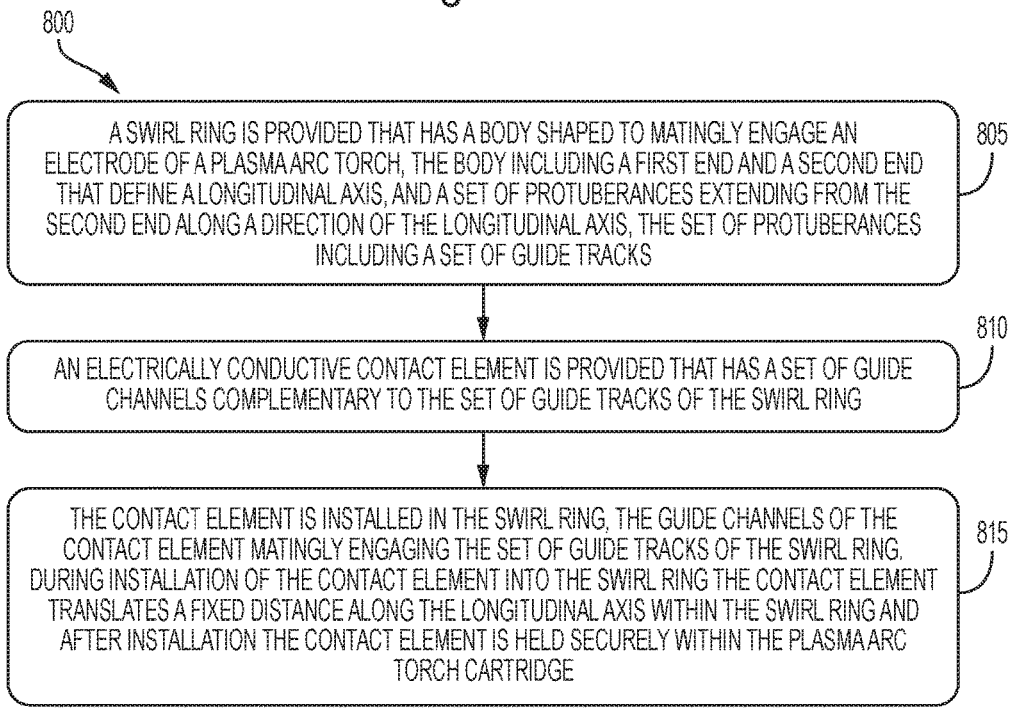
FIG. 8 is a flow diagram illustrating a method of assembling a plasma arc torch cartridge, according to an illustrative embodiment of the invention.

FIG. 8 is a flow diagram illustrating a method 800 of assembling a plasma arc torch cartridge, according to an illustrative embodiment of the invention. In a first step 805, a swirl ring is provided that has a body shaped to matingly engage an electrode of a plasma arc torch, the body including a first end and a second end that define a longitudinal axis, and a set of protuberances extending from the second end along a direction of the longitudinal axis, the set of protuberances including a set of guide tracks. In a second step 810, an electrically conductive contact element is provided that has a set of guide channels complementary to the set of guide tracks of the swirl ring. In a third step 815, the contact element is installed in the swirl ring, the guide channels of the contact element matingly engaging the set of guide tracks of the swirl ring. During installation of the contact element into the swirl ring the contact element translates a fixed distance along the longitudinal axis within the swirl ring, and wherein after installation the contact element is held securely within the plasma arc torch cartridge. In some embodiments, after installation the contact element is able to translate a fixed distance within the plasma arc torch cartridge along the longitudinal axis. In some embodiments, the translation of the contact element in a direction of the second end is limited by at least one retaining feature disposed on an interior surface of at least one of the protuberances.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A cartridge frame for mating with a plasma arc torch having a cartridge sensing switch and one or more consumables seated in the frame of the plasma arc torch during operation, the cartridge frame comprising:
   a body configured to at least partially surround and slidingly engage an electrode of the plasma arc torch, the body including a first end and a second end nearest the torch and opposite the first end, the first and second ends defining a longitudinal axis, and at least one discrete protuberance extending from the second end of the body in a direction of the longitudinal axis,
   wherein the at least one protuberance is configured to mechanically engage the cartridge sensing switch of the plasma arc torch during operation of the plasma arc torch.

2. The swirl ring of claim 1 further including a set of molded swirl holes integrally formed within the body of the cartridge frame.

3. The cartridge frame of claim 1 further including a crimped on, unitary nozzle.

4. The cartridge frame of claim 1 further including an electrically conductive contact element confined within the at least one protuberance, wherein the at least one protuberance includes a set of guide tracks configured to engage a set of guide channels on a contact element that is complementary to the set of guide tracks.

5. The cartridge frame of claim 4 wherein the at least one protuberance includes at least one retaining feature to confine a contact element.

6. The cartridge frame of claim 1 wherein the at least one protuberance includes a guide track for interfacing with a contact element.

7. The cartridge frame of claim 1 wherein the at least one protuberance includes one or more axial stops.

8. The cartridge frame of claim 1 further including an electrode disposed within the swirl ring, the electrode including a spring configured to bias a contact element toward a cathode of the plasma arc torch.

9. The cartridge frame of claim 1 wherein the at least one protuberance is shaped to matingly engage a contact element and to define a translation path of the contact element within the cartridge frame.

10. The frame cartridge of claim 1 wherein the one or more protuberances has a linear height of between approximately 5 and 7 millimeters.

11. The frame cartridge of claim 1 wherein the one or more protuberances has a linear width of between approximately 1 and 3 millimeters.

12. A consumable cartridge for mechanically engaging with a consumable sense feature of a plasma arc torch having one or more consumables seated in the frame of the plasma arc torch during operation, the consumable cartridge including a cartridge frame comprising:
    means for engaging the consumable sense feature of the plasma arc torch during operation of the plasma arc torch, the means extending in a direction of a longitudinal axis of the consumable cartridge.

13. The consumable cartridge of claim 10 wherein the means for engaging the consumable sense feature of the plasma arc torch during operation of the plasma arc torch includes one or more protuberances.

14. The consumable cartridge of claim 13 wherein the one or more protuberances includes a guide track for interfacing with a contact element configured to be held within the consumable cartridge.

15. The consumable cartridge of claim 13 wherein the one or more protuberances includes an axial stop.

16. The consumable cartridge of claim 13 further including an electrode disposed within the consumable cartridge, the electrode interacting with a spring configured to bias a contact element toward a cathode of the plasma arc torch.

17. The consumable cartridge of claim 13 wherein the one or more protuberances is shaped to matingly engage a contact element and to define a translation path of the contact element within the consumable cartridge.

18. The consumable cartridge of claim 13 wherein the one or more protuberances has a linear height of between approximately 5 and 7 millimeters.

19. The consumable cartridge of claim 13 wherein the one or more protuberances has a linear width of between approximately 1 and 3 millimeters.

20. A consumable cartridge for mechanically engaging with a consumable sense feature of a plasma arc torch having one or more consumables seated in the frame of the plasma arc torch during operation, the consumable cartridge comprising:
    a body configured to at least partially surround and slidingly engage an electrode of the plasma arc torch, the body including a distal first end and a proximal second end opposite the first end, the first and second ends defining a longitudinal axis; and
    an intermediate component configured to be positioned between the body and a safety switch of the plasma arc torch, the intermediate component including at least one discrete protuberance affixed to a proximal end of the intermediate component, the discrete protuberance extending from the proximal end of the intermediate component in a direction of the longitudinal axis,
    wherein the at least one discrete protuberance is configured to enable an operation of the plasma arc torch by the plasma arc torch sensing a presence of a consumable of the plasma arc torch by the safety switch.

21. The consumable cartridge of claim 20 wherein the one or more protuberances has a linear height of between approximately 5 and 7 millimeters.

22. The consumable cartridge of claim 20 wherein the one or more protuberances has a linear width of between approximately 1 and 3 millimeters.

23. A method of enabling an operation of a plasma arc torch having a safety switch and one or more consumables seated in the frame of the plasma arc torch during operation, the method comprising:
    providing a plasma arc torch cartridge having a protuberance on a body of the plasma arc torch cartridge, the protuberance extending from the plasma arc torch cartridge; and
    installing the plasma arc torch cartridge in a plasma arc torch, the protuberance mechanically activating a safety switch for sensing a presence of the torch cartridge of the plasma arc torch during operation of the plasma arc torch.

* * * * *